Aug. 28, 1945.  J. W. LOY  2,383,729
CATALYST CHAMBER APPARATUS
Filed Dec. 9, 1943
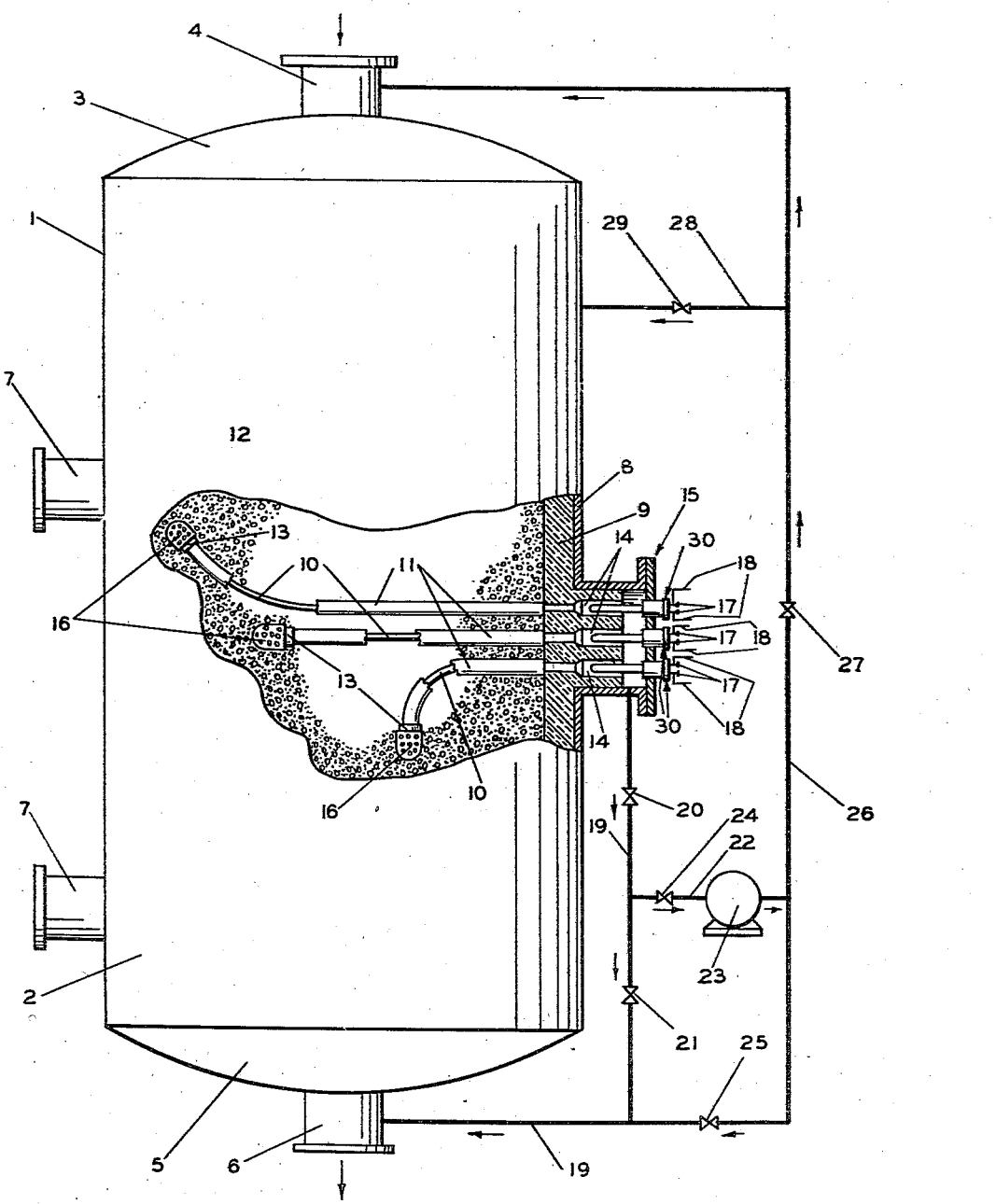
INVENTOR
J. W. LOY
BY Hudson, Young & Guiger
ATTORNEYS Patented Aug. 28, 1945

2,383,729

UNITED STATES PATENT OFFICE 2,383,729

CATALYST CHAMBER APPARATUS

John W. Loy, McLean, Va., assignor to Phillips Petroleum Company, a corporation of Delaware Application December 9, 1943, Serial No. 513,594

10 Claims. (Cl. 23—288)

This invention relates to catalyst chambers of the character generally employed in the cracking of hydrocarbons in the presence of one or more beds of suitable solid catalyst material. This invention more specifically pertains to improved apparatus for more accurately and readily determining the temperature of fluid material passing through one or more regions within an individual mass of solid catalyst material, either in the course of a catalytic conversion of hydrocarbons within the chamber and/or in the course of reactivating the catalyst material after the same has become contaminated with carbonaceous material that has been deposited thereon during the hydrocarbon conversion procedure.

There have been a number of worthwhile advances in recent years in the art of catalytically cracking hydrocarbons in the presence of solid catalysts and the subsequent regeneration of the solid catalysts in situ in order to remove contaminating carbonaceous deposits resulting from the catalytic conversion. Regardless of whether the reaction taking place in a catalyst chamber is either endothermic or exothermic in character, it is essential that the temperature developed within the chamber be properly controlled at all times. For example, in the endothermic conversion of hydrocarbons in the presence of one or more beds of solid catalyst material, heat from an outside source must generally be supplied to the reaction in order that the same may be successfully carried to completion. It is generally customary to supply this heat by means of steam or other suitable fluid under proper conditions of temperature and pressure in order that the temperature of the fluid undergoing reaction may be controlled and maintained within proper limits. Also, in the subsequent course of the exothermic regeneration of spent catalysts to remove carbon deposits from the catalyst, it is highly essential that the temperatures developed within the catalyst chamber are properly controlled. In this connection the temperatures developed within the chamber must be sufficiently high to allow for the combustion of the carbonaceous deposits, but must not be permitted to exceed a predetermined maximum, depending upon the particular catalyst employed, lest the catalyst be damaged thereby.

It will be observed from the foregoing that an accurate knowledge of the temperatures developed within a catalyst chamber and the proper control of said temperatures are very important factors in the efficient operation of a catalyst chamber when the same is employed during either the hydrocarbon conversion or catalyst regeneration portion of a complete cycle.

When a plurality of beds of solid catalyst material are employed in a single catalyst chamber, the temperatures developed in individual catalyst beds are different and vary in the course of a reaction. Moreover, whether a plurality of catalyst beds or a single catalyst bed is employed, the temperatures within an individual bed vary for different regions or zones therein. It has hence been found desirable to ascertain the temperature of fluid passing through various portions of a solid catalyst bed in order that necessary precautionary and control steps may be taken by the operator. The present invention is directed to apparatus which is capable of being advantageously employed to effectively and accurately determine the temperature of fluid in one or more regions or zones of a mass of solid catalyst material. The apparatus of my invention may be readily placed in communication with any desired region of a bed of solid catalyst material. Mechanical obstructions within a catalyst chamber do not in any way affect the disposition of the inlet of my device in any predetermined location within a catalyst bed. Moreover, any settling of the catalyst material in an individual bed or movements of parts within the chamber due to thermal expansion or contraction thereof, will not result in damage or injury to the apparatus of the instant invention. Additionally, the apparatus of this invention permits the ascertainment of the temperature of the fluid in any predetermined location within a bed of solid catalyst material, as distinguished from present day types of apparatus, wherein the thermocouple employed is in direct contact with the catalyst itself and, as a result thereof, the temperature indications obtained therefrom are that of the catalyst, rather than the fluid within the chamber. As will be apparent to persons skilled in the art, accurate knowledge of the temperature of the fluid in any region of a bed of catalyst is more desirable and informative than the temperature of the catalyst itself.

This invention has for its primary object the provision of apparatus of the character indicated which is capable of being readily employed to accurately obtain the temperature developed in any predetermined region or regions within a mass of solid catalyst material.

Another object of the present invention is the provision of apparatus for more effectively determining the temperature of fluid in any desired zone of a bed of solid catalyst material.

These, as well as other objects and advantages, will be readily comprehended by persons skilled in the art, upon reference to the following detailed description, taken in conjunction with the annexed drawing wherein a preferred embodiment of the invention is illustrated in elevation with parts thereof shown in enlarged central cross section.

There is illustrated in the drawing a catalyst chamber, generally indicated by reference numeral 1, and including a vertical cylindrical side wall 2, a top wall 3 having an inlet 4, a bottom wall 5 having an outlet 6, and a plurality of inlets 7 disposed in vertical wall 2 for conveying a heat control fluid medium into the chamber. When catalyst chamber 1 is being employed to carry out a hydrocarbon conversion reaction, a stream of hydrocarbon feed stock is preferably introduced into chamber 1 through inlet 4 and the converted products are discharged from the chamber by way of outlet 6. Similarly, when contaminated solid catalyst material is being treated within the catalyst chamber to burn off carbonaceous material deposited therein in the course of the preceding hydrocarbon conversion reaction, regenerating fluid is preferably introduced into chamber 1 through inlet 4 and spent regenerating fluid is withdrawn from the chamber by way of outlet 6. Necessary quantities of suitable fluid heat control medium under proper conditions of temperature and pressure are introduced into the chamber through inlets 7, during the hydrocarbon reaction and the catalyst regeneration operations. The walls of chamber 1 are fabricated from plate or sheet metal 8 of requisite composition and thickness and carry an inner liner 9 of a suitable refractory insulation, such as the well-known insulag or insulcrete.

A plurality of readily flexible conduits 10 that may be of the same or different length and that are covered with a sheath of heat insulating material 11 extend through vertical wall 2 of the chamber and into a bed of solid catalyst material 12. Each conduit 10 is provided with an inlet 13 that may be disposed in any desired predetermined region or zone in the bed of catalyst material and an outlet 14 that communicates with a header or receptacle, generally denoted by reference numeral 15. A screen or similar perforate closure 16 is disposed across inlet 13 of each conduit to permit fluid in the corresponding region of the bed of catalyst material to enter the conduits and be transmitted therethrough into receptacle 15, but to prevent solid catalyst material from entering said conduits. A plurality of thermocouples, generally designated by reference numeral 30, and each including a pair of terminals 17 and electrical conductors 18, are carried by receptacle 15 and project into the outlets 14 of corresponding conduits 10. The fluid transmitted through the conduits from the various regions within the bed of catalyst material impinges upon the thermocouples and is collected in receptacle 15.

The fluid, so collected within receptacle 15, may, if desired, be transmitted into outlet 6 by way of a line 19 having a control valve 20 and a shut off valve 21. The function of valve 20 is to maintain the rate of fluid flow at the minimum required to obtain proper temperature determination. Since the pressure of the fluid collected within receptacle 15 is generally higher than the pressure in outlet 6, said fluid may, as a rule, be transmitted through line 19 without the aid of auxiliary pumping equipment. If preferred, however, the fluid collected in receptacle 15 may be returned to inlet 4 of the chamber or to some other point intermediate inlet 4 and outlet 6 of the chamber. For this purpose, it is recommended that a bypass 22, having a pump 23 disposed therein and a pair of valves 24 and 25 communicating with opposite ends of the pump, be arranged across line 19, and that a line 26 communicating with bypass 22, as allowed by a valve 27, communicate with inlet 4 directly and with the interior of chamber 1 through side wall 2 by way of a line 28, having a control valve 29 therein.

It will be obvious to persons skilled in the art that by opening certain valves and closing certain other valves, the fluid collected in receptacle 15 may be transmitted into inlet 4, outlet 6, directly into the interior of chamber 1 by way of line 28, or in any combination of the foregoing. For example, if it is desired to transmit the fluid collected in receptacle 15 into inlet 4, only, valves 21, 25 and 29 are closed while the remaining valves, namely, valves 20, 24 and 27 are open.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawing shall be interpreted as illustrative only and not in a limiting sense.

I claim:

1. In apparatus of the character described wherein a closed chamber having a fluid inlet and a fluid outlet contains at least one bed of solid catalyst material, the improvement comprising a heat insulated conduit adapted to transmit fluid from the interior to the exterior of the chamber and including an inlet and an outlet, said conduit being adapted to extend into the chamber so that its inlet is disposed in a predetermined region of the catalyst bed and its outlet communicates with the exterior of the chamber, a thermocouple having at least a portion thereof disposed in the conduit outlet, and means communicating with the conduit outlet and adapted to return fluid transmitted through the conduit to the interior of the chamber.

2. The improvement in accordance with claim 1 wherein at least a portion of the conduit is flexible.

3. The improvement in accordance with claim 1 wherein the conduit is provided with an external sheath of heat insulating material and at least a portion of said conduit is readily distortable.

4. The improvement in accordance with claim 1 and including perforate means disposed across the inlet passage to permit the admission of fluid into the conduit while preventing the admission of solid catalyst material thereinto.

5. The improvement in accordance with claim 1 wherein at least a portion of the conduit is flexible, and including a sheath of heat insulating material on the external surface of the conduit and perforate means across the inlet passage to permit the admission of fluid into the conduit while preventing the admission of solid catalyst material thereinto.

6. In apparatus of the character described wherein a closed chamber having a fluid inlet and a fluid outlet contains at least one bed of solid catalyst material, the improvement comprising a receptacle, a plurality of heat insulated conduits adapted to transmit fluid from the interior of the chamber into the receptacle, said conduits each including an outlet that communicates with the receptacle and extending into the chamber so that its individual inlet is disposed in a corresponding predetermined region of the catalyst bed, a thermocouple for each conduit, at least a portion of each thermocouple being disposed in the outlet of the corresponding conduit, and means communicating with the receptacle and adapted to return fluid transmitted thereinto to the interior of the chamber.

7. The improvement in accordance with claim 6 wherein at least a portion of each conduit is flexible.

8. The improvement in accordance with claim 6 wherein each conduit is provided with an external sheath of heat insulating material and at least a portion of each conduit is readily distortable.

9. The improvement in accordance with claim 6 and including perforate means disposed across the inlet passage of each conduit to permit the admission of fluid into the corresponding conduit while preventing the admission of solid catalyst material thereinto.

10. The improvement in accordance with claim 6 wherein at least a portion of each conduit is flexible, and including a sheath of heat insulating material on the external surface of each conduit and perforate means across the inlet passage of each conduit to permit the admission of fluid into the corresponding conduit while preventing the admission of solid catalyst material thereinto.

JOHN W. LOY.